(12) United States Patent
Trinh et al.

(10) Patent No.: US 6,619,763 B2
(45) Date of Patent: Sep. 16, 2003

(54) FEED-THROUGH FILTER CAPACITOR WITH NON-OVERLAPPING ELECTRODES

(75) Inventors: Hung Trinh, San Diego, CA (US); Daniel F. Devoe, San Diego, CA (US)

(73) Assignee: Presidio Components, Inc., San Diego, CA (US)

( * ) Notice: Subject to any disclaimer, the term of this patent is extended or adjusted under 35 U.S.C. 154(b) by 0 days.

(21) Appl. No.: 10/136,789

(22) Filed: May 3, 2002

(65) Prior Publication Data

US 2003/0007310 A1 Jan. 9, 2003

Related U.S. Application Data

(63) Continuation-in-part of application No. 09/865,816, filed on May 5, 2001, now Pat. No. 6,525,854.

(51) Int. Cl.[7] .......................... H01G 4/35; H01G 4/005
(52) U.S. Cl. ...................................... 304/302; 361/303
(58) Field of Search .......................... 361/301.2–301.4, 361/302–305, 306.1–306.3, 307–309, 311–313, 322, 321.1–321.5

(56) References Cited

U.S. PATENT DOCUMENTS

| | | | |
|---|---|---|---|
| 4,148,003 A | 4/1979 | Colburn et al. |
| 4,247,881 A | 1/1981 | Coleman |
| 5,333,095 A | 7/1994 | Stevenson et al. |
| 5,751,539 A | 5/1998 | Stevenson et al. |
| 5,822,174 A | 10/1998 | Yamate et al. |
| 5,825,608 A | 10/1998 | Duva et al. |
| 5,870,272 A | 2/1999 | Seifried et al. |
| 5,905,627 A | 5/1999 | Brendel et al. |
| 5,926,357 A | 7/1999 | Elias et al. |
| 5,959,829 A | 9/1999 | Stevenson et al. |
| 5,973,906 A | 10/1999 | Stevenson et al. |
| 5,999,398 A | 12/1999 | Makl et al. |
| 6,008,980 A | 12/1999 | Stevenson et al. |
| 6,018,448 A | 1/2000 | Anthony |
| 6,191,931 B1 | 2/2001 | Paspa et al. |
| 6,208,501 B1 | 3/2001 | Ingalls et al. |
| 6,414,835 B1 | 7/2002 | Wolf et al. |

*Primary Examiner*—Dean A. Reichard
*Assistant Examiner*—Eric W. Thomas
(74) *Attorney, Agent, or Firm*—Wood, Herron & Evans, L.L.P.

(57) ABSTRACT

A feed-through capacitor has layers of dielectric material and a first hole that passes through the layers of dielectric material for receiving an electrical conductor connected to the filter capacitor. First, second and third electrodes are disposed between layers of the dielectric material and extend in a first direction substantially perpendicular to a centerline of the first hole. The third electrodes are disposed intermediate the first and second electrodes. Any one of the first, second and third electrodes is non-overlapping with any of another of the first, second and third electrodes in a direction substantially parallel to the centerline of the first hole. A filtering capacitor is formed substantially wholly by fringe-effect capacitance between the first and third electrodes, and a coupling capacitor is formed substantially wholly by fringe-effect capacitance between the second and third electrodes. The filtering and coupling are electrically connected in series.

49 Claims, 7 Drawing Sheets

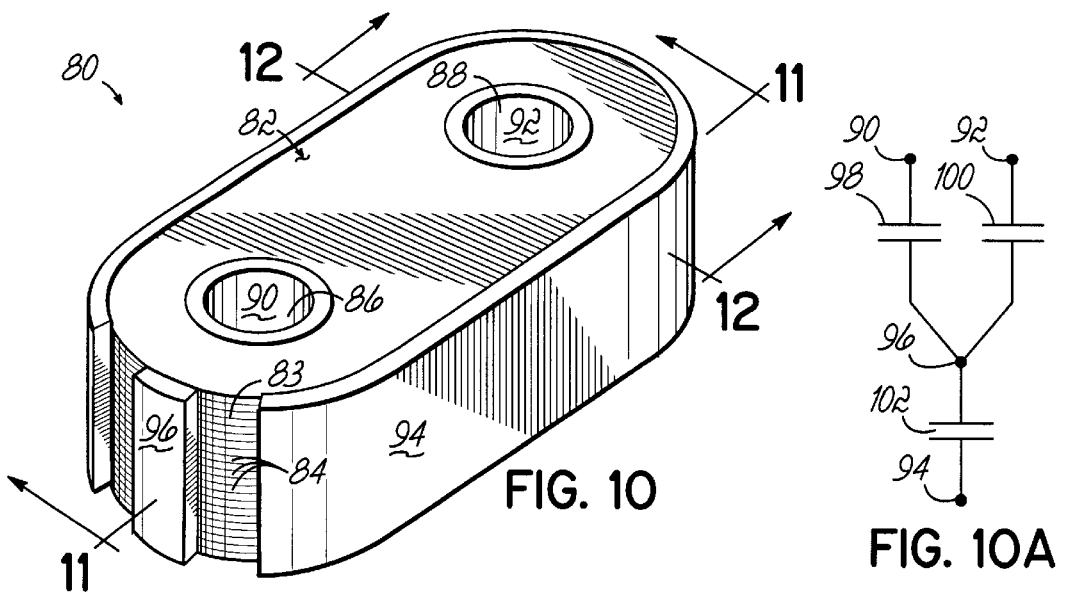
FIG. 10
FIG. 10A
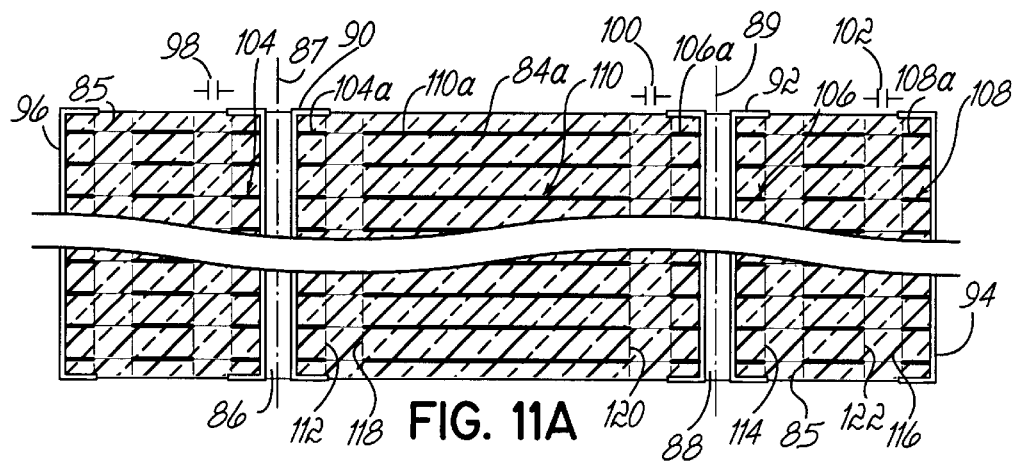
FIG. 11A
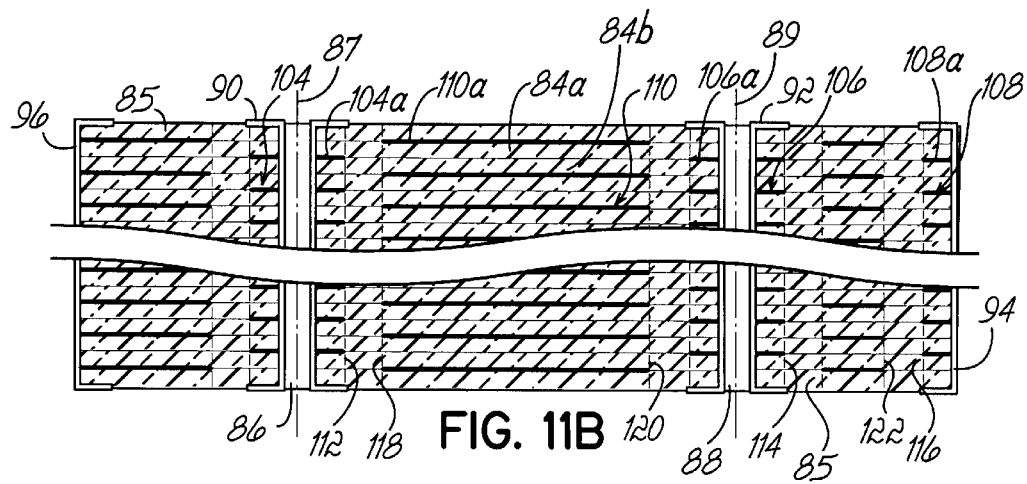
FIG. 11B

FEED-THROUGH FILTER CAPACITOR WITH NON-OVERLAPPING ELECTRODES

This application is a continuation-in-part of U.S. application Ser. No. 09/865,816 filed May 25, 2001, now U.S. Pat. No. 6,545,854, entitled FRINGE-FIELD NON-OVERLAPPING-ELECTRODES DISCOIDAL FEED-THROUGH CERAMIC FILTER CAPACITOR WITH HIGH BREAKDOWN VOLTAGE.

FIELD OF THE INVENTION

The present invention generally concerns filter capacitors and more particularly, the organization of internal electrodes within a feed-through filter capacitor.

BACKGROUND OF THE INVENTION

The present invention relates to the placement of internal electrodes within a multi-layer, feed-through filter capacitor made of a dielectric material such as a ceramic dielectric material. Wires carrying electrical signals to be filtered pass through one or more holes that are most commonly aligned to the axis of the disc. Capacitance between spaced-parallel plate regions is a function of their separation. Further, plate density cannot be particularly high in a multi-layer capacitor that relies on only a relatively thin ceramic layer to limit the breakdown voltage. It has heretofore been believed that metal plate regions of alternating polarity should be stacked along and transverse to an axis the hole. The metal plate regions are normally in a parallel relationship and partially overlap each other. The metal plate regions are parallel and overlapping so as to create capacitance along the elementary model of two parallel plate electrodes. The formula for the capacitance of the conventional parallel-plate ceramic capacitor is $$Cap = \frac{kA}{d}$$

where

Cap is the capacitance in farads, k is the dielectric constant in farads per meter, A is the area of electrode overlap in square meters, and d is the distance of separation between plates in meters.

Although d would desirably be minimized for greatest capacitance, in high voltage capacitors, d cannot be indefinitely small or else the capacitor will be subject to failure from voltage breakdown of the insulating ceramic dielectric. For example, referring to FIGS. 1A and 1B, a known multi-layer, discoidal, feed-through ceramic filter capacitor 1 has a central hole, or bore, that is typically surfaced with first conductive metal 11, and external rim surface, or circumference, that is typically surfaced with a second conductive metal 12. Conductive metals 11 and 12 may be the same type of metal. The capacitor 1 is substantially made from multiple layers 13x of ceramic 13. Between the layers 13x are a number of ring-shaped first metallized areas, or plates, 14x that collectively form a first electrode 14, and a number of ring-shaped second metallized areas, or plates, 15x that collectively form a second electrode 15.

The external diameter D of the capacitor 1 is typically about 0.105 inch ("in.") or 105 mils; the internal diameter d is about 35 mils; and the overall thickness T is about 65 mils. A typical ceramic dielectric will have a voltage rating of 100 volts per mil (0.001 in) thickness. For example, if the capacitor 1 is designed to have a breakdown voltage of about 1000 volts, an axial plate separation, that is, the ceramic dielectric thickness t in the axial direction between adjacent plates 14x, 15x must be about 10 mils.

Another aspect of high voltage ceramic capacitor design relates to the distance d1 of separation between any electrode plate 14x, 15x and respective external metal 11, 12 in the radial direction along the layers 13x. The radial plate separation d1 should be 50% greater than the plate separation in the axial direction transverse to the layers 13x. This is because a voltage breakdown is more likely to occur along the unavoidable imperfections of the seams 16 between layers 13x. Thus, the distance d1 should be about 15 mils, that is, 1.5×10 mils.

The internal design of the prior art feed-through multi-layer ceramic capacitor 1 with a 1000 volt rating shown in FIG. 1B has a thickness t of 10 mils layer-to-layer, and an end margin d1 to both electrodes 14, 15 of 15 mils. The capacitor 1 has top and bottom ceramic covers that are 7.5 mils thick, and therefore, the overall thickness of the ceramic 13 is about 65 mils. Given a desired separation of 10 mils, the number of active internal plates 14x, 15x is thus three of each polarity; and those plates have a total overlapping area A of 0.001099 sq.in., that is, $((0.0375 \text{ in})^2 - (0.0325 \text{ in})^2)\pi$.

Capacitors so constructed are of particular use to filter electrical signals upon the wires and leads of implanted cardiac pacemakers and cardiac defibrillators. These latter devices use high voltages, commonly about 750 volts. When the electrodes of a filter capacitor are subjected to high voltages, for example, on the order of hundreds and, with safety margins, even thousands of volts, the partially-overlapped metal plates 14x, 15x are subject to develop voltage breakdown paths. Such paths can occur between adjacent plates through the ceramic and/or to oppositely-charged regions of the outside surface of the capacitor where electrical connections are made.

Thus, there is a need for an improved laminated discoidal feed-through ceramic filter capacitor of substantially the same size that provides a greater capacitance while at the same time has a substantially higher breakdown voltage.

SUMMARY OF THE INVENTION

The present invention provides a multi-layer, feed-through filter capacitor that has a significantly higher voltage breakdown threshold than known capacitors of comparable size. Thus, the filter capacitor of the present invention is especially useful in applications where higher voltages may be expected and can be used in a wider range of more rigorous applications than known comparable capacitors. The feed-through filter capacitor of the present invention has a further advantage of being able to easily measure the capacitance of each of the filter and coupling capacitors within the feed-through filter capacitor.

According to the principles of the present invention and in accordance with one embodiment, the present invention provides a feed-through capacitor having layers of dielectric material. A feed-through filter capacitor has layers of dielectric material having at least one hole passing therethrough with first electrodes disposed on the dielectric material layers and extending in a first direction substantially perpendicular to a centerline of the hole. Second and third electrodes are disposed on layers of the dielectric material and also extend in the first direction. Any one of the first, second and third electrodes are non-overlapping with any of another of the first, second and third electrodes in a second direction substantially parallel to a centerline of the hole. The non-overlapping electrodes provide a feed-through filter capacitor having a higher voltage breakdown threshold than known capacitors of comparable size.

In one aspect of this invention, a first capacitor is formed substantially wholly by fringe-effect capacitance between the first and third electrodes, and a second capacitor is formed substantially wholly by fringe-effect capacitance between the second and third electrodes. First, second and third electrode contacts are electrically connected to respective first, second and third electrodes. The first capacitor is electrically connected between the first and third electrode contacts, and the second capacitor is electrically connected between the second and third electrode contacts. The first and the second capacitors are electrically connected in series between the first and the second electrode contacts. User accessibility to the third electrode permits the electrical characteristics of each of the first and second capacitors to be independently measured.

In another embodiment of the invention, a feed-through filter capacitor has layers of dielectric material having at least two holes passing therethrough with first electrodes disposed on layers of the dielectric material and extending in a first direction substantially perpendicular to a centerline of the hole. In addition, second, third and fourth electrodes are disposed on layers of the dielectric material and extend in the first direction. Any one of the first, second, third and fourth electrodes are non-overlapping with any of another of the first, second, third and fourth electrodes in a second direction substantially parallel to a centerline of one of the holes.

In one aspect of this invention, a first capacitor is formed substantially wholly by fringe-effect capacitance between the first and fourth electrodes; a second capacitor is formed substantially wholly by fringe-effect capacitance between the second and fourth electrodes; and a third capacitor is formed substantially wholly by fringe-effect capacitance between the fourth and third electrodes. First, second, third and fourth electrode contacts are electrically connected to the respective first, second, third and fourth electrodes. The first capacitor is electrically connected between the first and the fourth electrode contacts; the second capacitor is electrically connected between the second and the fourth electrode contacts; and the third capacitor is electrically connected between the fourth and the third electrode contacts. The first and the third capacitors are electrically connected in series between the first and the third electrode contacts, and the second and the third capacitors are electrically connected in series between the second and the third electrode contacts. Again, user accessibility to the fourth electrode permits the electrical characteristics of each of the first, second and third capacitors to be independently measured.

These and other objects and advantages of the present invention will become more readily apparent during the following detailed description taken in conjunction with the drawings herein.

BRIEF DESCRIPTION OF THE DRAWINGS

FIG. 10 is a perspective view of a further embodiment of a multi-hole filter capacitor in accordance with the principles of the present invention.

FIG. 10A is an electrical schematic diagram of the multi-hole filter capacitor of FIG. 10.

FIGS. 11A, 11B, 11C are cross-sectional views taken along line 11—11 of FIG. 10 and illustrate a three embodiments of the multi-hole filter capacitor of FIG. 10.

DETAILED DESCRIPTION OF THE INVENTION

Figure 1A:
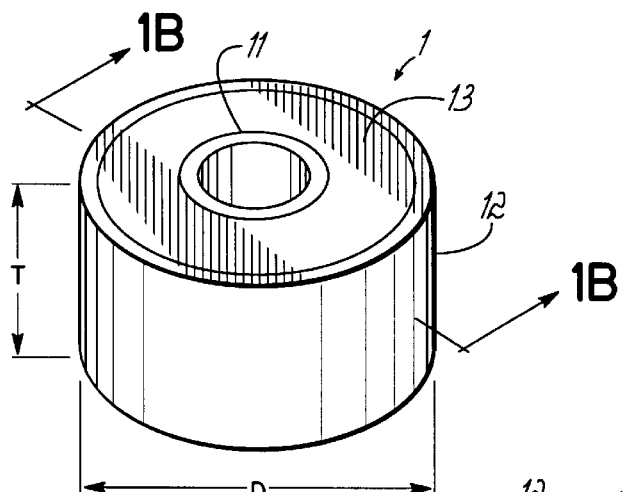
FIG. 1A is a diagrammatic perspective view showing a known laminated discoidal feed-through ceramic filter capacitor.
Figure 1B:
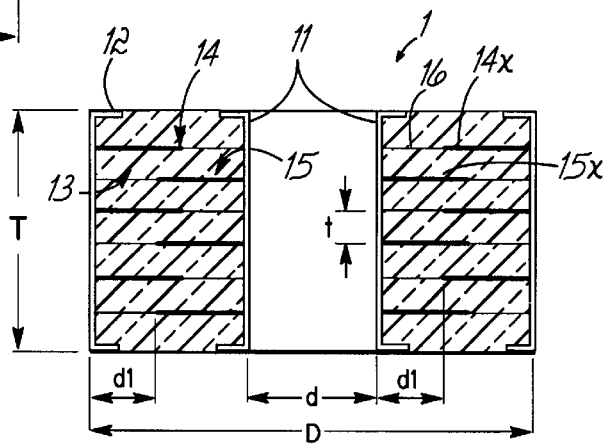
FIG. 1B is a centerline cross-sectional view taken along line 1B—1B of FIG. 1A and illustrates the internal electrode structure of the feed-through ceramic filter capacitor of FIG. 1A.
Figure 2A:
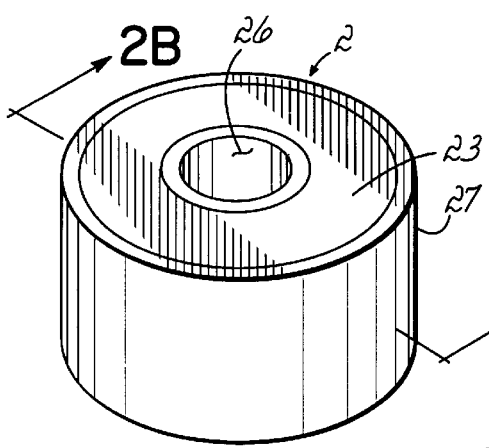
FIG. 2A is a is a diagrammatic perspective view showing a first embodiment of a laminated, discoidal, feed-through ceramic filter capacitor with high breakdown voltage in accordance with the principles of the present invention.
Figure 2B:
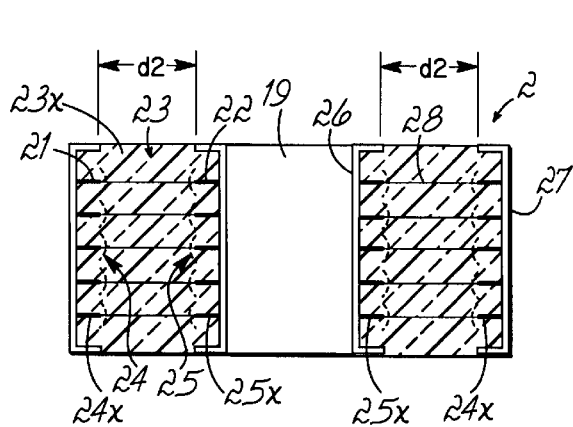
FIG. 2B is a centerline cross-sectional view taken along line 2B—2B. of FIG. 2A and illustrates the internal electrode structure of the feed-through ceramic filter capacitor of FIG. 2A.

Referring to FIGS. 2A and 2B, a laminated or multilayered, discoidal or annular, feed-through ceramic filter capacitor 2 has exterior measurements that, for purposes of this description and comparison, are substantially identical to the known capacitor 1 shown in FIG. 1. That is, the capacitor 2 has an external diameter D of about 100 mils, a centrally located hole 19 providing an internal diameter d of about 35 mils and a thickness T of about 70 mils. The mode and manner of electrical connection with capacitors 1 and 2 is likewise the same. However, referring to FIG. 2B, the number of plates 24x, 25x of each electrode 24, 25 is substantially greater than the number of plates 14x, 15x in the known capacitor 1 of FIG. 1. The plates 24x, 25x are desirably placed as closely as is practical, thereby necessitating an increased number of relatively thinner ceramic layers 23x of a ceramic dielectric body 23. The ceramic covers on the top and the bottom of the capacitor 2 are about 5 mils thick. The result is that the combined plates 24x and 25x act as nearly continuous, axial extending electrodes 24, 25, respectively.

This represents a substantial difference over the known capacitor 1 of FIG. 1. As the thickness t increases as it must to prevent voltage breakdown in available ceramic materials at high electrode voltage differentials, a substantial portion of the overall capacitance starts to accrue from what is called "fringe-effect". Fringe-effect capacitance is always present between an inner end of each plate and an electrode of an opposite polarity. For example, referring to capacitor 1 of FIG. 1, fringe-effect capacitance exists between the ends of plates 14x, 15x and the respective exterior metal 11, 12 portions of opposite polarity When the capacitor is used at a lower voltage, and smaller plate-to-plate spacing t, the fringe-effect capacitance is a negligible contribution to the overall capacitance and is disregarded. However, in a high voltage multi-layer ceramic capacitor 1 with relatively large plate-to-plate spacing t the fringe capacitance commences to be a sizable, measurable portion of the total capacitance.

The multi-layer ceramic capacitor construction as exemplified by the capacitor 2 of FIG. 2 with its short closely spaced electrode plates 24x, 25x maximizes the fringe-effect capacitance. With sufficiently numerous electrode plates 24x, 25x, the electric field lines of plates of each electrical polarity merge. The "fringe-effect" electric field is illustrated in FIG. 2B by the "arcs" (shown in phantom) appearing around respective interior ends 21, 22 of the electrode plates 24x, 25x of the capacitor 2. The illustrated fringe-effect arcs do not represent any physical structure, but the fringe-effect capacitances at the respective ends 21, 22 of the electrode plates 24x, 25x electrically function as two cylindrical virtual electrodes 24, 25. Capacitance can now effectively be calculated as the area of, and distance between, the two cylinders. The electrode plates 24x, 25x extend in a radial direction toward each other about 7.5 mils, thereby resulting in a separation d2 between the electrode plates 24x, 25x of opposite polarities of about 20 mils, that is, (35-7.5-7.5) mils. The effective area of the capacitor 2 of the present invention is $\Pi \times d \times h$, where d is the diameter of a midpoint between the two cylinders and is used as an estimate of capacitance. Thus, solving the equation, 3.14×0.070 in×0.060 in.=01318 sq.in, or approximately 12 times the area of the conventional prior art capacitor 1 of FIG. 1. However, the capacitance of the capacitor 2 of FIG. 2 is not twelve times greater than the known capacitor 1 of FIG. 1 because there is some contribution by "fringe-effect" capacitance in the capacitor 1 of conventional design.

For purposes of comparison, both capacitors 1 and 2 have essentially identical capacitance. Since there are no overlapping plates, by spacing the plates close together, the fringe-effect capacitance becomes the only contribution to total capacitance. However, capacitor 2 has a significantly higher breakdown voltage than capacitor 1. As mentioned above, the separation d2 between the electrode plates 24x, 25x of opposite polarities is about 20 mils. That separation is twice the 10 mils. minimum electrode separation for the typical known 1000 volt capacitor 1 shown in FIG. 1 The increased separation d2 provides the capacitor 2 of FIG. 2 with a significantly greater breakdown voltage than a comparable known capacitor of FIG. 1.

In using the capacitor 2, an electrical connection is made between the first metal 26 and a wire (not shown) passing through the hole 19; and a second electrical connection is made between the second metal 27 and ground. Such connections result in a first fringe-effect electrical field developing at and between the ends 21 of the electrode plates 24x and a second fringe-effect electrical field developing at and between the ends 22 of the electrode plates 25x within the ceramic body 23. A capacitance comparable with the capacitance of the known feed-through capacitor 1 of FIG. 1 is developed between these first and second fringe-effect electrical fields. This capacitance is fully suitable to filter electromagnetic interference/radio frequency interference (EMI/RFI) present in electrical signals upon the wire.

The filter capacitor 2 of the present invention is thus different not only in the sizes and the placement of its metallized areas, or electrodes plates 24x, 25x within the ceramic body 23, but by its intentional use, and coupling, of fringe-effect capacitance as a primarily capacitance developed between the two electrodes 24, 25. Thus, fringe-effect capacitance is no longer secondary but, is primary to capacitor performance.

Further, the separation of electrode plates 24x of one polarity from electrode plates of an opposite polarity 25x is greater than comparable separations in the known capacitor 1 of FIG. 1. Accordingly, the breakdown voltage of the ceramic filter capacitor 2 of FIG. 2 is greater than the breakdown voltage of the known capacitor 1 of FIG. 1.

Figure 3:
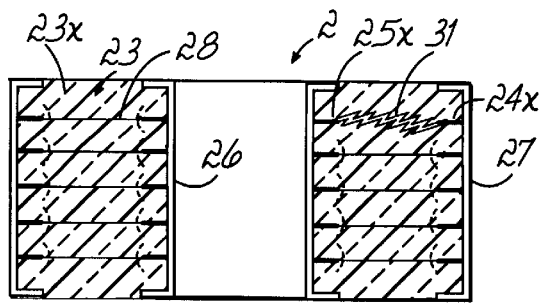
FIG. 3 is another centerline cross-sectional view of the feed-through ceramic filter capacitor of FIG. 2A and illustrates a potential voltage breakdown path.

In the embodiment of FIG. 2, the laid-up laminated layers 23x of the multi-layer ceramic body 23 have boundaries 28 (shown in phantom) that extend between the plates 24x, 25x. Despite the considerable distance between the ends of the plates 24x, 25x, such boundaries 28 are relatively more susceptible to providing a voltage breakdown path and failure than a voltage breakdown path extending transverse to the boundaries 28, that is, through respective ceramic layers 23x in an axial direction. Therefore, as shown in FIG. 3, the capacitor 2 can suffer voltage breakdown at, and along, a path 31 generally defined by the lamination boundaries 28 of the laid-up laminated layers 23x of the multi-layer ceramic body 23.

Figure 4:
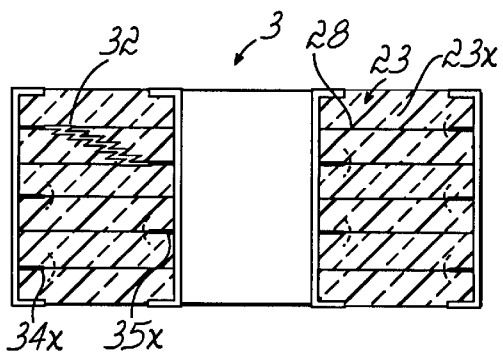
FIG. 4 is a centerline cross-sectional view illustrating internal electrodes of a second embodiment of a laminated, discoidal, feed-through ceramic filter capacitor in accordance with the principles of the present invention.

Referring to FIG. 4, in another embodiment of the invention, a capacitor 3 has electrode plates 34x, 35x on alternating ceramic layers 23x of the ceramic body 23. A potential voltage breakdown path 32 is shown as a jagged line in FIG. 4. Such a path 32 requires that breakdown occur both in a radial direction in FIG. 4, and in an axial direction in FIG. 4, between laid-up ceramic layers 23x. Such a failure path is uncommon and will not normally occur until extreme voltages are reached.

In use, capacitors 2, 3 of the respective FIGS. 2 and 4 utilize the same materials in their construction and have substantially identical form factors as the known capacitor 1 of FIG. 1. However, the capacitor 2 of FIG. 2 reliably doubles the voltage breakdown threshold of 1,000 volts for the known capacitor 1 of FIG. 1 to about 2,000 volts. Further, with the capacitor 3 of FIG. 4, the breakdown voltage is consistently about 3,000 volts; and selected individual capacitors 3 demonstrate a breakdown voltage in excess of 4,000 volts These substantial increases in breakdown voltages correspondingly substantially increase the range of applications in which the capacitors 2 and 3 can be reliably used.

Figure 5A:
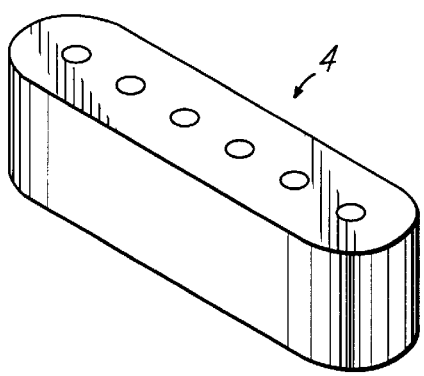
FIG. 5A is a perspective view of a multi-hole ceramic filter capacitor in accordance with the principles of the present invention.
Figure 5B:
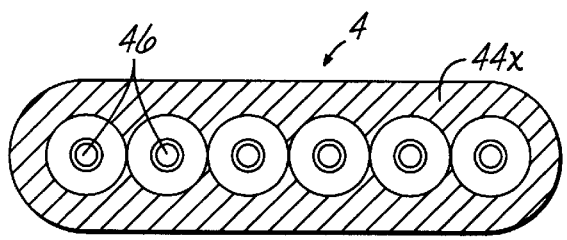
FIG. 5B is a top plan view of an exterior metallized area of the ceramic filter capacitor of FIG. 5A.

The principles of the present invention, for example, as described with respect to FIG. 4, are readily extended to multi-layer ceramic feed-through capacitors of alternative configurations. For example, the common "racetrack" discoidal form capacitor 4 of FIG. 5A has six holes 46 that accommodate six leads, or wires 47 (not shown) carrying electrical signals that are to be filtered. In accordance with the present invention, internal plates 44x of one electrode 44, normally the ground, are shown on one cross-section of the capacitor 4 in FIG. 5B, and internal plates of the other electrode 45x are shown on another cross-section of the capacitor 4 in FIG. 5C.

Figure 5C:
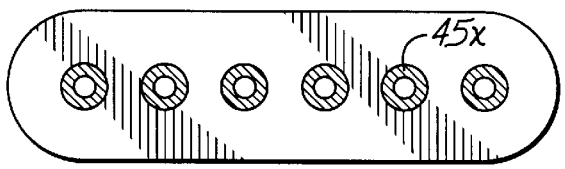
FIG. 5C is a top plane view of an interior metallized area of the ceramic filter capacitor of FIG. 5A.

Note that the plates 45x of the internal electrode 45 are shown somewhat abbreviated in annular width in FIG. 5C relative to the width that they had in, for example, FIGS. 2B, 3 and 4. A practitioner of the art of capacitor design will recognize that a juxtaposition of the fringing fields of the internal electrodes of each polarity, as is best shown in FIG. 2B, is what is desired, and that this can be realized without being hidebound as to the size and extent of the internal electrodes, or plates. The interior electrode might in particular be smaller because there will be some fringing fields directly to the wire, or lead, that passes through the central hole. The small annulus of the interior electrode of FIG. 5C requires some accuracy in the placement of the hole relative to the inner interior electrode. But even if the hole and the wire, or lead, passing therethrough was to be so far off center so as to break the annulus of an inner interior electrode plate 45x, the capacitor would still work.

Figure 6:
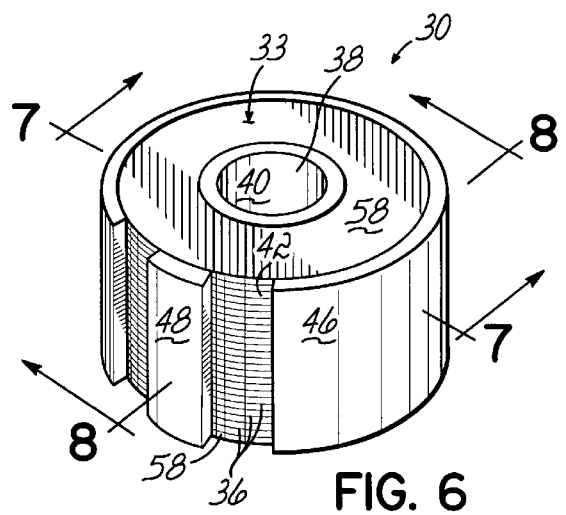
FIG. 6 is a perspective view of a further embodiment of a single-hole filter capacitor in accordance with the principles of the present invention.
Figure 6A:
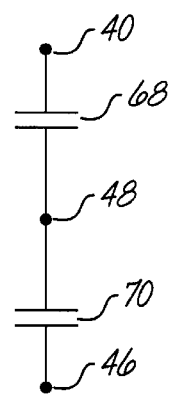
FIG. 6A is an electrical schematic diagram of the single-hole filter capacitor of FIG. 6.

Further alternative embodiments of the present invention are shown in FIG. 6. A single-hole, feed-through filter capacitor 30 has a body 33 comprising layers 36, 58 of a dielectric material, for example, a ceramic dielectric material. The body 33 has a hole 38 extending therethrough. Within the hole is a first electrode contact 40 that is connectable with a wire lead (not shown) extending into the hole 38. The layers of dielectric material 36, 58 collectively provide an external surface 42. A second electrode contact 46 extends around a larger first portion of the outer body surface 42. A third electrode contact 48 extends over a smaller portion of the external body surface 42. As shown in FIG. 6A, the feed-through filter capacitor 30 has a construction that provides a first filter capacitor 68 between the first and third electrode contacts 40, 48 and a serial, second coupling capacitor 70 between the third and second electrode contacts 48, 46. A serial circuit of the filter capacitor 68 and the coupling capacitor 70 is provided between the first and second electrode contacts 40, 46. The second electrode contact 46 is connectable to a metallic contact, for example, a socket receiving the filter capacitor 30, that is normally connected to a ground. The third electrode contact 48 can be used for diagnostic purposes, for example, to check the capacitance of either of the capacitors 68, 70.

Figure 7A:
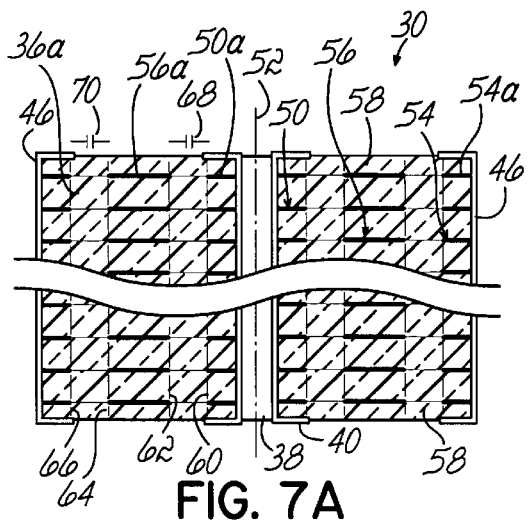
FIGS. 7A, 7B, 7C are cross-sectional views taken along line 7—7 of FIG. 6 and illustrate a three embodiments of the single-hole filter capacitor of FIG. 6.
Figure 8A:
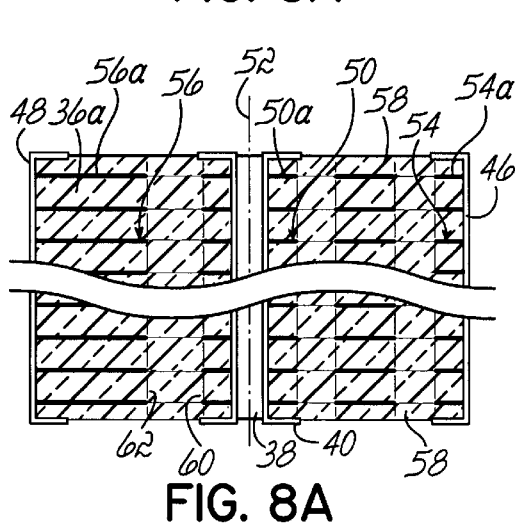
FIGS. 8A, 8B, 8C are cross-sectional views taken along line 8—8 of FIG. 6 and further illustrate the embodiments of the single-hole filter capacitor of FIG. 6.
Figure 9A:
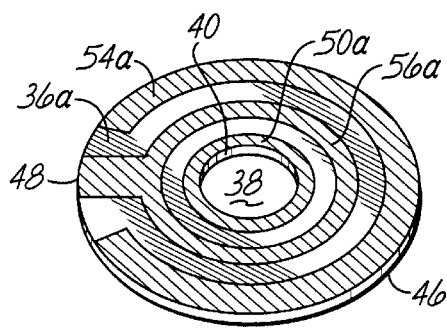
FIGS. 9A, 9B, 9C are perspective views illustrating disassembled dielectric material layers and the electrodes located therebetween for the three embodiments of the single-hole filter capacitor of FIG. 6.

Referring to FIGS. 7A, 8A and 9A, the first electrode contact 40 is electrically connected to first metallized areas or electrodes 50 that are separated by dielectric material layers 36. For example, a first electrode 50a is disposed on dielectric material layer 36a. The first electrodes 50 have respective inner edges electrically connected to the first electrode contact 40, and the first electrodes 50 extend between the dielectric material layers 36 in a radially outward direction, that is, generally perpendicular to a centerline 52 of the hole 38.

The second electrode contact 46 is electrically connected to second metallized areas or electrodes 54 that are also separated by dielectric material layers 36. In this embodiment, the second electrodes 54 are disposed on the same layers of dielectric material as the first electrodes 50, for example, electrode 54a is disposed on the dielectric material layer 36a. The second electrodes 54 have respective outer edges electrically connected to the electrode contact 46, and the second electrodes 54 extend between the dielectric material layers 36 in a radially inward direction, that is, generally perpendicular to the centerline 52.

The third electrode contact 48 is electrically connected to third metallized areas or electrodes 56 that are also disposed on the same dielectric material layers 36 as the first and second electrodes 50, 54. However, the third electrodes are located between the first electrodes 50 and the second electrodes 54 For example, as shown in FIG. 9A, a third electrode 56a is disposed on the same dielectric material layer 36a that contains the first and second electrodes 50a, 54a, however the third electrode 56a is disposed substantially between the first and second electrodes 50a, 54a The third electrodes 56 also extend radially between the dielectric material layers 36 in a direction substantially perpendicular to the centerline 52.

In the embodiment illustrated in FIGS. 7A, 8A, 9A, the dielectric material layers 36 have a thickness of about 3.2 mils. Further, the upper and lower dielectric material layers or caps 58 have a thickness of about 3.5 mils. The single-hole, feed-through capacitor 30 has about 19 layers of dielectric material 36 separating about 20 of each of the first, second and third electrodes 50, 54, 56. Thus, the feed-through capacitor 30 is approximately the same size as the known capacitor of FIG. 1, that is, the feed-through capacitor 30 has a thickness T of about 68 mils, an outer diameter D of about 100 mils and an inner diameter of the hole 38 of about 35 mils.

As with the capacitors described earlier, with the feed-through capacitor 30, the first, second and third electrodes 50, 54, 56 do not overlap from one dielectric layer to another, that is, the first, second and third electrodes 50, 54, 56 are non-overlapping in a direction substantially parallel to the centerline 52 of the hole 38. Further, the dielectric material layers 36 are sufficiently thin and the first, second and third electrodes 50, 54, 56 sufficiently numerous so as to provide a substantial fringe-effect capacitance in higher voltage applications. With sufficiently numerous and closely spaced first, second and third electrodes 50, 54, 56, the electric field lines of each electrical polarity merge to form virtual capacitor plates extending axially, that is, substantially parallel to the centerline 52. For example, referring to FIG. 7A, the fringe-effect capacitance at the outer ends of the first electrodes 50 forms a first virtual cylindrical capacitor plate 60, and the fringe-effect capacitance at the inner ends of the third electrodes 56 forms a second virtual generally cylindrical capacitor plate 62. Thus, a filtering capacitor 68 is provided by the virtual capacitor plates 60, 62. Similarly, the fringe-effect capacitance at the outer ends of the third electrodes 56 forms a virtual cylindrical capacitor plate 64, and the fringe-effect capacitance at the inner ends of the second electrodes 54 forms a virtual generally cylindrical capacitor plate 66. The virtual capacitor plates 64, 66 form a coupling capacitor 70 that is in series with the filtering capacitor 68.

The capacitance of the serial filtering and coupling capacitors is calculated as the area of, and distance between, two cylinders in a manner as previously described. Thus, with the feed-through capacitor 30, substantially all of its capacitance is provided by fringe-effect capacitance; and the capacitor 30 is especially useful for higher voltage applications. The distance between the first virtual capacitor plates 60, 62, that is, the distance between the outer ends of the first electrodes 50 and the inner ends of the third electrodes 56, should be equal to, or more than, the thickness of the dielectric material layers 36, for example, about 3.6–20 mils.

Figure 7B:
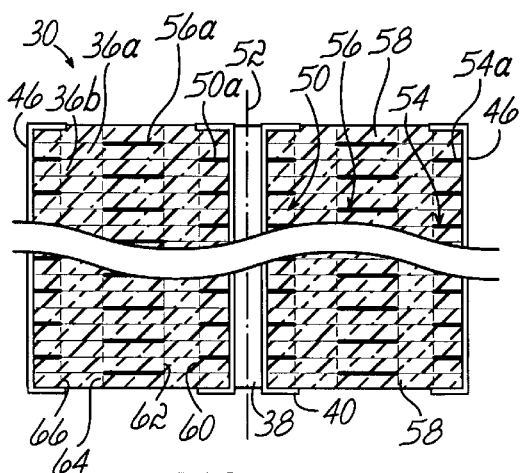
Figure 8B:
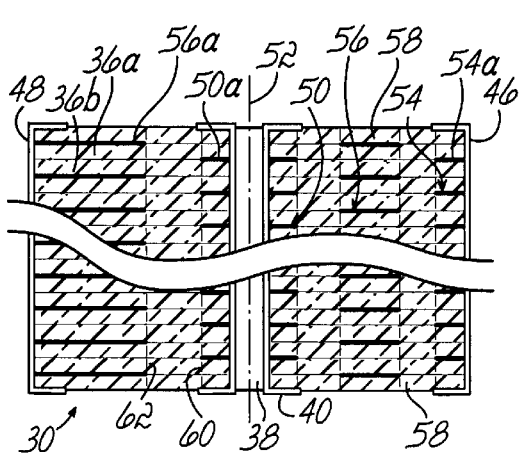
Figure 9B:
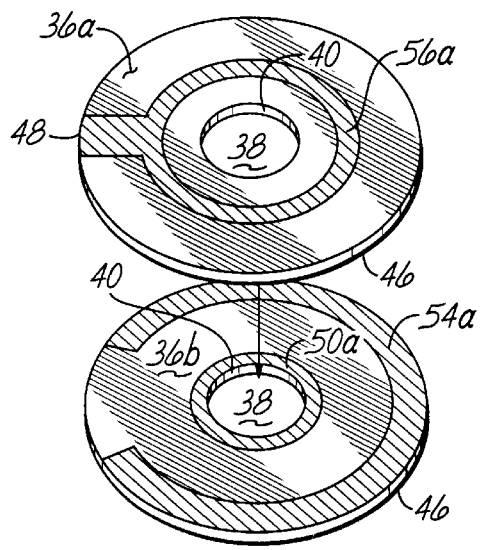

FIGS. 7B, 8B and 9B illustrate another embodiment of the feed-through capacitor 30. In this embodiment, the third electrodes 56 are separated from the first and second electrodes 50, 54 by a layer of dielectric material, for example, the third electrode 56a is separated from the first and second electrodes 50a, 54a by the dielectric layer 36a. Thus, as shown in FIG. 9B, the third electrode 56a is disposed on a layer of dielectric material 36a, and the first and second electrodes are disposed on a layer of dielectric material 36b. Further, projections of edges of the third electrode 56a in a direction parallel to the centerline 52 are substantially between the first and second electrodes 50a, 54a. With this embodiment, there are about 19 of each of the first and second electrodes 50, 54 and about 20 of the third electrodes 56. The feed-through capacitor 30 has about 38 layers of dielectric material 36 that are about 1.6 mils thick separating the electrodes 50, 54 from the electrodes 56. The feed-through capacitor 30 also has top and bottom caps 58 of a dielectric material. Again, the dielectric material layers 36 are sufficiently thin and the electrodes 50, 54, 56 sufficiently numerous that in higher voltage applications, there is sufficient fringe-effect capacitance to form the virtual capacitor plates 60, 62, 64, 66 and the filtering and coupling capacitors 68, 70 that provide the desired serial filtering and coupling functions. Further, the separation of the third electrodes 56 from the first and second electrodes 50, 54 substantially increases the resistance of the feed-through capacitor 30 to breakdown at higher voltages.

Figure 7C:
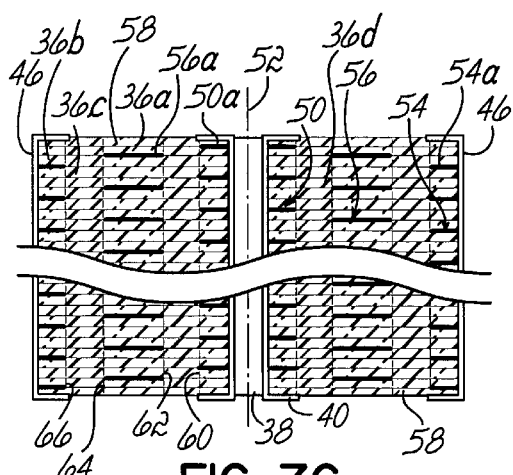
Figure 8C:
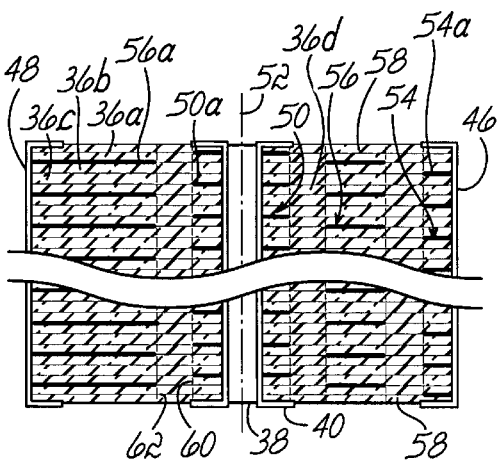
Figure 9C:
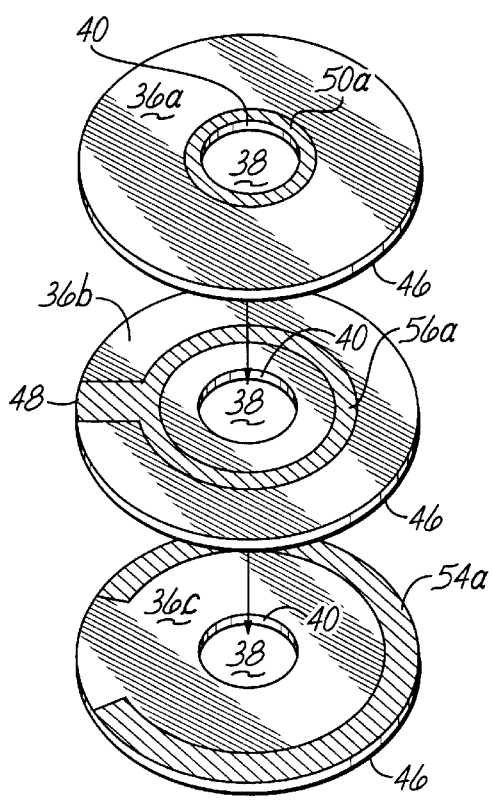

FIGS. 7C, 8C and 9C illustrate a further embodiment of the feed-through capacitor 30. In this embodiment, different layers of dielectric material 36 separate each of the first, second and third electrodes 50, 54, 56 For example, one layer of dielectric material 36a separates the first and third electrodes 50a, 56a, and another layer of dielectric material 36b separates the third and second electrodes 56a, 54a. Thus, as shown in FIG. 9C, the first electrode 50a is disposed on the first layer of dielectric material 36a, the second electrode 56a is disposed on a second layer of dielectric material 36b; and the third electrode 54a is disposed on a third layer of dielectric material 36c. Again, projections of edges of the third electrode 56a in a direction parallel to the centerline 52 are substantially between the first and second electrodes 50a, 54a. With this embodiment, there are about 20 of each of the first, second and third electrodes 50, 54, 56. The feed-through capacitor 30 has about 59 layers of dielectric material 36 that are about 1.0 mil thick separating the electrodes 50, 54, 56 from each other. The feed-through capacitor 30 also has top and bottom caps 58 of a dielectric material. Again, the dielectric material layers 36 are sufficiently thin and the electrodes 50, 54, 56 sufficiently numerous that in higher voltage applications, there is sufficient fringe-effect capacitance to form the virtual capacitor plates 60, 62, 64, 66. The virtual capacitor plates 60, 62, 64, 66 are effective to provide the filtering and coupling capacitors 68, 70. Further, the separation of each of the first, second and third electrodes further increases the resistance of the feed-through capacitor 30 to breakdown at higher voltages.

Referring to FIG. 10, in a further embodiment, a multi-hole, feed-through filter capacitor 80 has a body 82 comprising layers 84 of a dielectric material, for example, a ceramic dielectric material. The body 82 has first and second holes 86, 88 extending therethrough. The first and second holes 86, 88 have respective first and second electrode contacts 90, 92. A third electrode contact 94 extends around a substantial first portion of an outer surface 83 of the body 82, and a fourth electrode contact 96 extends over a smaller portion of the external surface of the body 82. As shown in FIG. 10A, the feed-through filter capacitor 80 has a construction that provides a first filter capacitor 98 between the first and fourth electrode contacts 90, 96, a second filter capacitor 100 between the second and fourth electrode contacts 92, 96, and a serial, coupling capacitor 102 between the third and fourth electrode contacts 94, 96. Thus, a first circuit having the first filtering capacitor 98 in series with the coupling capacitor 102 is provided between the electrode contacts 90, 94. A second circuit having the second filtering capacitor 100 in series with the coupling capacitor 102 is provided between the electrode contacts 92, 94.

The first and second electrode contacts 90, 92 are connectable to wire leads (not shown) extending into the respective holes 86, 88. The third electrode contact 94 is electrically connectable to an external contact, for example, a socket receiving the filter capacitor 80, that is normally connected to a ground. The fourth electrode contact 96 is also electrically connectable to an external contact and is used for diagnostic purposes, for example, to check the capacitance of the capacitors 98, 100, 102.

Figure 11C:
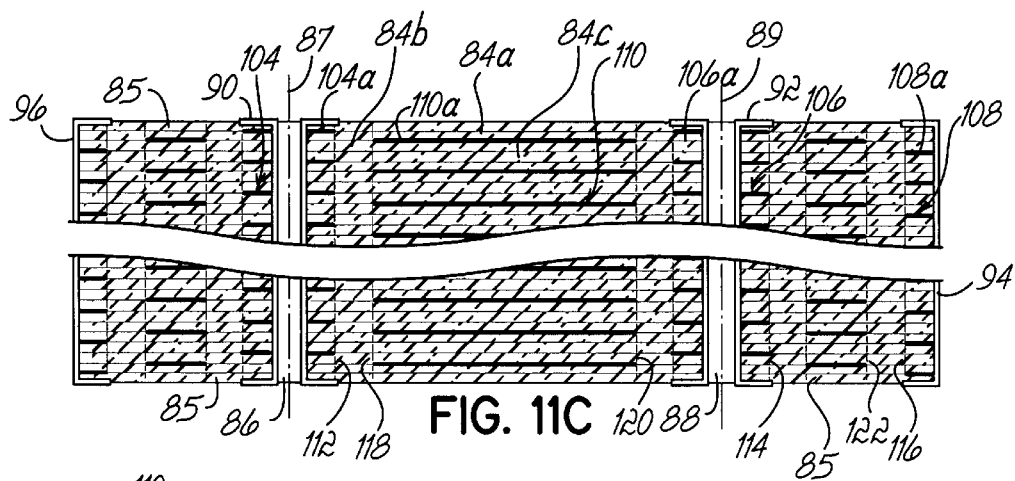
Figure 12A:
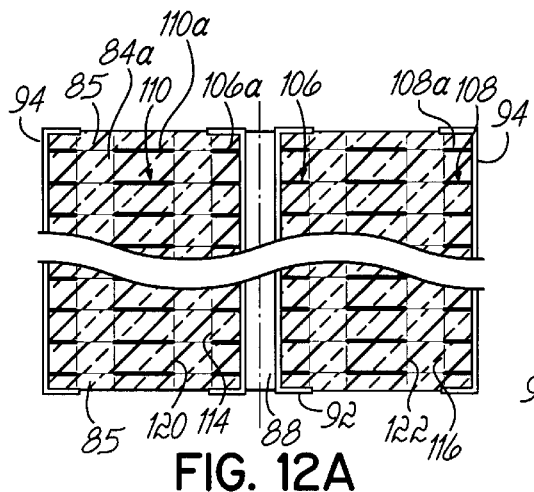
FIGS. 12A, 12B, 12C are cross-sectional views taken along line 12—12 of FIG. 10 and further illustrate the embodiments of the multi-hole filter capacitor of FIG. 10.
Figure 13A:
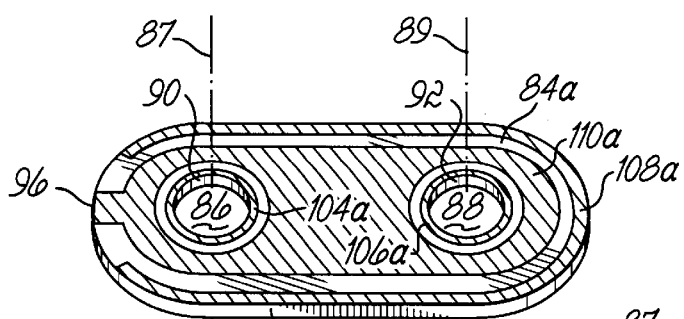
FIGS. 13A, 13B, 13C are perspective views illustrating disassembled dielectric material layers and the electrodes located therebetween for the three embodiments of the multi-hole filter capacitor of FIG. 10.

Referring to FIGS. 11A, 12A and 13A, the first and second electrode contacts 90, 92 are electrically connected to first and second metallized areas or electrodes 104, 106, respectively. The third electrode contact 94 is electrically connected to third metallized areas or electrodes 108. The fourth electrode contact 96 is electrically connected to fourth metallized areas or electrodes 110 that are located between the first and third electrodes 104, 108 and also the second and third electrodes 106, 108. In this embodiment, respective ones of the first, second, third and fourth electrodes 104, 106, 108, 110 are disposed on a common layer of dielectric material, for example, as shown in FIG. 13A, first, second, third and fourth electrodes 104a, 106a, 108a, 110a are disposed on a common layer of dielectric material 84a. Further, one portion of the fourth electrode 110a is disposed substantially between the first and third electrodes 104a, 108a, and another portion of the fourth electrode 110a is disposed substantially between the second and third electrodes 106a, 108a. Thus, this embodiment is similar to the single-hole, feed-through capacitor construction shown and described with respect to FIGS. 7A, 8A, 9A.

In the embodiment illustrated in FIGS. 11A, 12A, 13A, the dielectric material layers 84 have a thickness of about 3.2 mils. Further, the upper and lower dielectric material layers or caps 85 have a thickness of about 3.5 mils. The multi-hole, feed-through capacitor 80 has about 19 layers of dielectric material 84 separating about 20 of each of the electrodes 104, 106, 108, 110. As with the capacitors described earlier, with the feed-through capacitor 80, the first, second, third and fourth electrodes 104, 106, 108, 110 do not overlap from one dielectric layer to another, that is, the first, second, third and fourth electrodes 104, 106, 108, 110 are non-overlapping in a direction substantially parallel to the centerlines 87, 89 of the respective holes 86, 88. Further, the dielectric material layers 84 are sufficiently thin and the electrodes 104, 106, 108, 110 sufficiently numerous, so as to provide a substantial fringe-effect capacitance.

Referring to FIG. 11A, with sufficiently numerous and closely spaced electrodes 104, 106, 108, 110, the electric field lines of each electrical polarity merge to form virtual capacitor plates extending axially, that is, substantially parallel to the centerlines 87, 89. For example, the fringe-effect capacitance at the outer ends of the first and second electrodes 104, 106 form respective first and second virtual cylindrical capacitor plates 112, 114. The fringe-effect capacitance at the inner ends of the third electrodes 108 forms a third virtual curvilinear, or generally oval, capacitor plate 116. A fourth virtual cylindrical capacitor plate 118 is formed by the fringe-effect capacitance at first edges of the fourth electrodes 110; a fifth virtual cylindrical capacitor plate 120 is formed by the fringe-effect capacitance at first edges of the fourth electrodes 110; and a sixth virtual curvilinear, or generally oval, capacitor plate 122 is formed by the fringe-effect capacitance at third edges of the fourth electrodes 110. Thus, a first filtering capacitor 98 is formed by the virtual capacitor plates 112, 118, and a second filtering capacitor 100 is formed by the virtual capacitor plates 114, 120. The virtual capacitor plates 116, 122 form the coupling capacitor 102. As with feed-through capacitor 30, the capacitance of the capacitors 98, 100, 102 is calculated as the area of, and distance between, virtual cylindrical capacitor plates 112–122. Thus, with the feed-through capacitor 80, substantially all of its capacitance is provided by fringe-effect capacitance, and the capacitor 80 is especially useful for higher voltage applications. The distance between the virtual capacitor plates, for example, the third and sixth virtual capacitor plates 116, 122, that is, the distance between the inner ends of the third electrodes 108 and the third edges of the fourth electrodes 110 should be equal to, or more than, the thickness of the dielectric material layers 84, for example, about 3.6–20 mils.

Figure 12B:
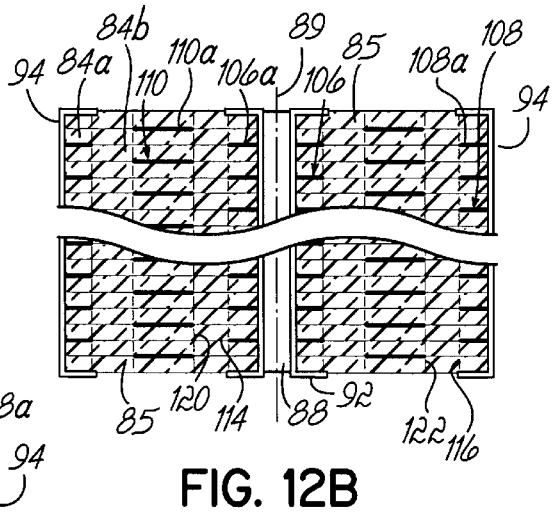
Figure 13B:
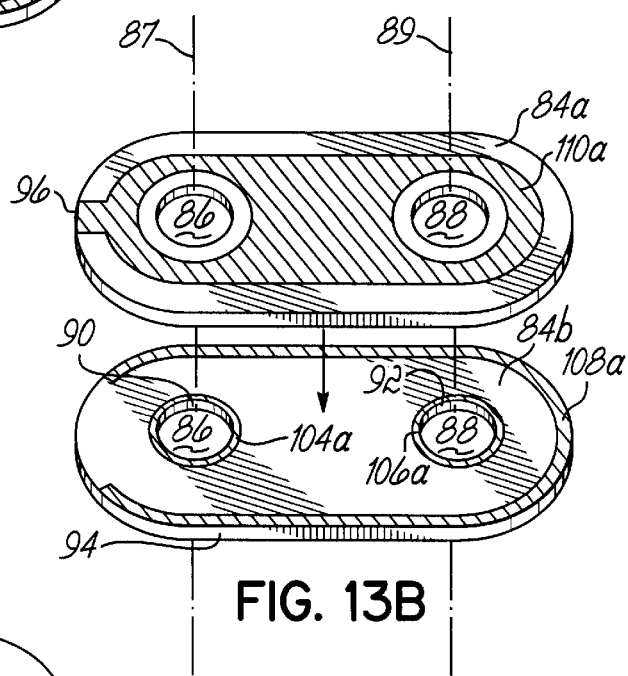

FIGS. 11B, 12B and 13B illustrate another embodiment of the feed-through capacitor 80. In this embodiment, the fourth electrodes 110 are separated from the first, second and third electrodes 104, 106, 108 by one of the dielectric layers 84a similar to the construction of the single-hole feed-through capacitor 30 described and illustrated with respect to FIGS. 7B, 8B and 9B. Thus, as shown in FIG. 13B, the fourth electrode 110a is disposed on a layer of dielectric material 84a, and the first, second and third electrodes 104, 106, 108 are disposed on a layer of dielectric material 84b. Further, projections of first edges of the fourth electrode 110a in a direction substantially parallel to the centerline 87 are disposed substantially between the first and third electrodes 104a, 108a. Projections of second edges of the fourth electrode 110a in a direction substantially parallel to the centerline 89 are disposed substantially between the second and third electrodes 106a, 108a. With this embodiment, there are about 19 of each of the first, second and third electrodes 104, 106, 108 and about 20 of the fourth electrodes 110. The feed-through capacitor 80 has about 38 layers of dielectric material 84 that are about 1.6 mils thick separating the first, second and third electrodes 104, 106, 108 from the fourth electrodes 110. Again, the dielectric material layers 84 are sufficiently thin and the first, second, third and fourth electrodes 104, 106, 108, 110 are sufficiently numerous that there is sufficient fringe-effect capacitance to form the virtual capacitor plates 112–122, the filtering capacitors 98, 100 and the coupling capacitor 102. Further, the separation of the fourth electrodes 110 from the first, second and third electrodes 104, 106, 108 substantially increases the resistance of the feed-through capacitor 80 to breakdown at higher voltages.

Figure 12C:
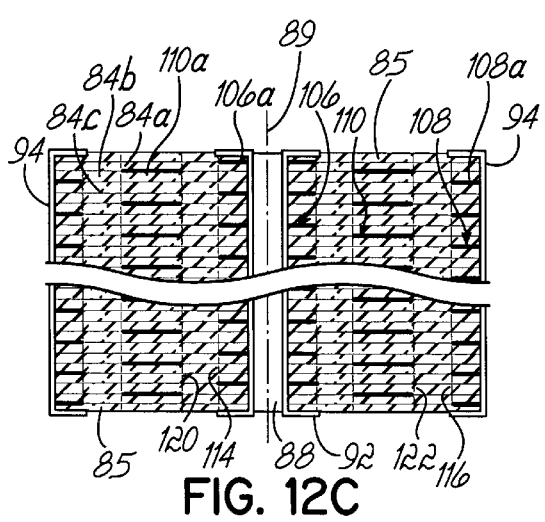
Figure 13C:
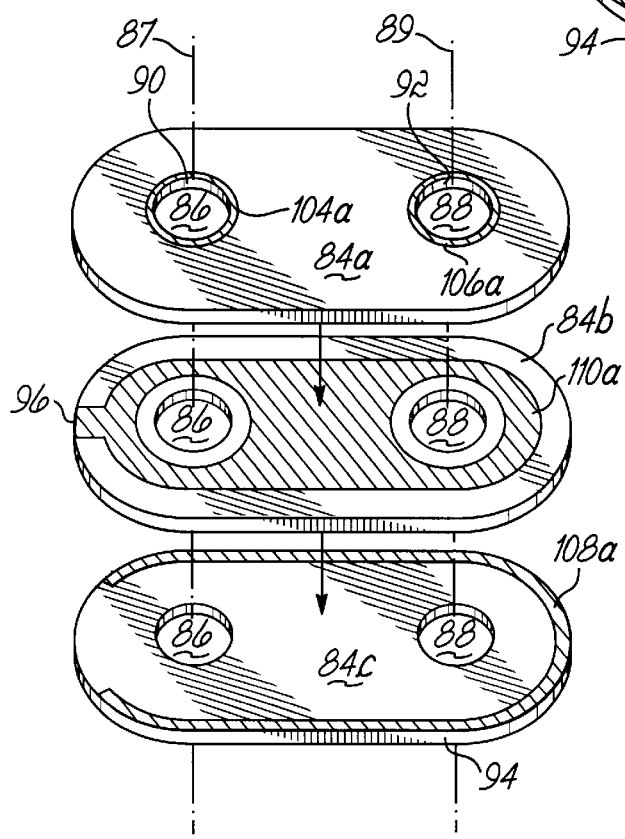

FIGS. 11C, 12C and 13C illustrate a further embodiment of the feed-through capacitor 80. In this embodiment, different layers of dielectric material 84 separate the first and second electrodes 104, 106 from each of the third and fourth electrodes 108, 110. For example, one layer of dielectric material 84a separates the first and second electrodes 104a, 106a from the fourth electrode 111a; and another layer of dielectric material 84b separates the fourth and third electrodes 110a, 108a. Thus, as shown in FIG. 13C, the first and second electrodes 104a, 106a are disposed on a first layer of dielectric material 84a; the fourth electrode 110a is disposed on a second layer of dielectric material 84b; and the third electrode 108a is disposed on a third layer of dielectric material 84c. Again, projections of first edges of the fourth electrode 110a in a direction substantially parallel to the centerline 87 are disposed substantially between the first and third electrodes 104a, 108a. Projections of second edges of the fourth electrode 110a in a direction substantially parallel to the centerline 89 are disposed substantially between the second and third electrodes 106a, 108a. With this embodiment, there are about 20 of each of the first, second, third and fourth electrodes 104, 106, 108, 110. The feed-through capacitor 80 has about 59 layers of dielectric material 84 that are about 1.0 ml thick separating the first, second, third and fourth electrodes 104, 106, 108, 110 from each other. Again, the dielectric material layers 84 are sufficiently thin and the first, second, third and fourth electrodes 104, 106, 108, 110 sufficiently numerous that, there is sufficient fringe-effect capacitance to form the virtual capacitor plates 112, 114, 116, 118, 120, 122. The virtual capacitor plates 112, 114, 116, 118, 120, 122 are effective to provide the filtering and coupling capacitors 98, 100, 102 as described earlier. Further, the separation of each of the first, second, third and fourth electrodes 104, 106, 108, 110 further increases the resistance of the feed-through capacitor 80 to breakdown at higher voltages.

In use, the feed-through filter capacitors 30, 80 are used to filter electromagnetic interference and/or radio frequency interference present in electrical signals conducted on a wire. The wire is electrically connected in hole 38 of capacitor 30 or one of the holes 86, 88 of the capacitor 80 in a known manner. The capacitors 30, 80 are mounted in a socket or otherwise supported in such a way that a ground potential is electrically applied to an electrode contact 46, 94 of the respective capacitors 30, 80. The capacitors 30, 80 are constructed such that none of the sets of electrodes overlap with any of the other sets of electrodes. Further, there is a sufficiently large number of electrodes that the desired filtering and coupling capacitors are created by fringe-effect capacitance within the capacitors 30, 80.

Thus, with non-overlapping sets of electrodes, the capacitors 30, 80 have a significant advantage of providing a significantly higher voltage breakdown threshold than known capacitors of comparable size. This substantially higher breakdown voltage threshold substantially increases the range of applications in which the capacitors 30, 80 can be reliably used. The capacitors 30, 80 have a further advantage in that the capacitors 30, 80 have respective user-accessible external electrode contacts 48, 96 that can be used for diagnostic purposes. For example, the capacitance and other electrical characteristics of each of the filter and coupling capacitors within the capacitors 30, 80 can be measured using the respective electrode contacts 48, 96.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the embodiment of FIG. 6, the capacitor 30 is annular or disc-shaped; and in FIG. 10, the capacitor is a substantially planar body with multiple holes each of which is capable of accepting at least one lead or wire. As will be appreciated, in other embodiments, the shape of the capacitors 30, 80 and the number of holes in capacitor 80 can vary depending on a particular application.

Further, regardless of the particular capacitor shape, the placement of the hole(s), by drilling or other processes, is not particularly dimensionally critical. The holes simply pass into internal disk-shaped metallized areas or plates that are part of the first electrode, and the diameter of those plates is substantially larger than is the hole.

Further, it should be noted that any misalignment of the central hole in the known feed-through filter capacitor 1 of FIG. 1 degrades capacitor performance both with respect to capacitance and breakdown voltage. The construction feed-through filter capacitors 30, 80 in accordance with the present invention as shown in FIGS. 6–13 are relatively immune to the placement of the central hole(s). So long as the diameter of the plates of respective central electrodes is sufficiently larger than the diameter of the hole, the plates are reliably contacted, and capacitor performance does not vary much with hole(s) misalignment(s).

In the described embodiments, the dielectric layers are laminated. However, as will be appreciated, in alternative embodiments, the layers need not be laminated, but could be created as a toroidal winding about single central hole. In the described embodiment, a feed-through capacitor having only two holes is shown for ease of illustration and description; however, the structure and operation of a feed-through capacitor in accordance with the principles of the present invention is not dependent on the number of holes. The structure and operation of a feed-through capacitor described herein can be used with a feed-through capacitor having any number of holes.

Therefore, the invention in its broadest aspects is not limited to the specific detail shown and described. Consequently, departures may be made from the details described herein without departing from the spirit and scope of the claims which follow.

What is claimed is:

1. A feed-through filter capacitor comprising:
   layers of dielectric material having at least one hole passing therethrough;
   first electrodes disposed on layers of the dielectric material and extending in a first direction substantially perpendicular to a centerline of the at least one hole;
   second electrodes disposed on layers of the dielectric material and extending in the first direction; and
   third electrodes disposed on layers of the dielectric material and extending in the first direction,
   the layers of dielectric material being sufficiently thin and the first, second and third electrodes being sufficiently numerous that a first capacitor is formed substantially wholly by fringe-effect capacitance between the first and third electrodes and a second capacitor is formed substantially wholly by fringe-effect capacitance between the second and third electrodes.

2. The feed-through filter capacitor of claim 1 further comprising:
   a first electrode contact electrically connected to the first electrodes;
   a second electrode contact electrically connected to the second electrodes; and
   a third electrode contact electrically connected to the third electrodes, the first capacitor being electrically connected between the first and third electrode contacts, the second capacitor being electrically connected between the second and third electrode contacts, and the first and the second capacitors being electrically connected in series between the first and the second electrode contacts.

3. The feed-through filter capacitor of claim 2 wherein the layers of dielectric material comprise a body of the feed-through filter capacitor having an external surface and the first electrode contact being disposed in the at least one hole and adapted to be electrically connectable to an electrical conductor extending through the at least one hole, the second electrode contact being formed over a first portion of the external surface and adapted to be electrically connectable to an external contact, and the third electrode contact being formed over a second portion of the external surface and adapted to be electrically connectable to an external contact.

4. The feed-through filter capacitor of claim 2 wherein
   ones of the first electrodes are disposed on respective layers of the dielectric material;
   ones of the second electrodes are disposed on the respective layers of the dielectric material with respective ones of the first electrodes; and
   ones of the third electrodes are disposed on the respective layers of the dielectric material with the respective ones of the first electrodes, the ones of the third electrodes being located between respective ones of the first and the second electrodes.

5. The feed-through filter capacitor of claim 2 wherein
   ones of the first electrodes are disposed on respective first layers of the dielectric material;
   ones of the second electrodes are disposed on the respective first layers of the dielectric material with respective ones of the first electrodes; and
   ones of the third electrodes are disposed on respective second layers of the dielectric material different from the first layers, projections of edges of the third electrodes taken in a direction substantially parallel to the centerline of the hole are substantially between the first and the second electrodes.

6. The feed-through filter capacitor of claim 2 wherein
   ones of the first electrodes are disposed on respective first layers of the dielectric material;
   ones of the second electrodes are disposed on respective second layers of the dielectric material different from the first layers; and
   ones of the third electrodes are disposed on respective third layers of the dielectric material different from the first and the second layers, projections of edges of the third electrodes taken in the second direction are substantially between the first and the second electrodes.

7. The feed-through filter capacitor of claim 1 wherein the layers of dielectric material are a ceramic dielectric material.

8. A feed-through filter capacitor comprising:
   layers of dielectric material forming a body having an external surface and having at least one hole passing therethrough;
   a first electrode contact disposed in the at least one hole and adapted to be electrically connectable to an electrical conductor extending through the hole;
   a second electrode contact formed over one portion of the external surface and adapted to be electrically connectable to a first external contact;
   a third electrode contact formed over another portion of the external surface and adapted to be electrically connectable to a second external contact;
   spatially overlapping first electrodes disposed on layers of the dielectric material and electrically connected to the first electrode contact;
   spatially overlapping second electrodes disposed on layers of the dielectric material and electrically connected to the second electrode contact; and spatially overlapping third electrodes disposed on layers of the dielectric material and electrically connected to the third electrode contact, wherein all electrodes spatially overlapping the second electrodes are connected to the second electrode contact.

9. The feed-through filter capacitor of claim 8 further comprising:
a first capacitor formed substantially wholly by fringe-effect capacitance between the first and third electrodes; and
a second capacitor formed substantially wholly by fringe-effect capacitance between the second and third electrodes, the first and second capacitors being electrically connected in series.

10. The feed-through filter capacitor of claim 8 wherein the dielectric material is a ceramic dielectric material.

11. The feed-through filter capacitor of claim 8 wherein
ones of the first electrodes are disposed on respective layers of the dielectric material;
ones of the second electrodes are disposed on the respective layers of the dielectric material with the first electrodes; and
ones of the third electrodes are disposed on the respective layers of dielectric material between the first and the second electrodes.

12. The feed-through filter capacitor of claim 11 further comprising:
about 19 layers of dielectric material;
about 20 first electrodes;
about 20 second electrodes; and
about 20 third electrodes.

13. The feed-through filter capacitor of claim 12 wherein each of the layers of dielectric material is about 3.2 mils thick.

14. The feed-through filter capacitor of claim 13 further comprises top and bottom cap layers of dielectric material covering respective top and bottom electrodes.

15. The feed-through filter capacitor of claim 8 wherein
ones of the first electrodes are disposed on respective first layers of the dielectric material;
ones of the second electrodes are disposed on the respective first layers of the dielectric material with respective ones of the first electrodes;
ones of the third electrodes are disposed on respective second layers of the dielectric material different from the first layers, projections of edges of the third electrodes taken in the second direction are substantially between the first and the second electrodes.

16. The feed-through filter capacitor of claim 15 further comprising:
about 38 layers of dielectric material;
about 19 of the first electrodes;
about 19 of the second electrodes; and
about 20 third electrodes.

17. The feed-through filter capacitor of claim 16 wherein each of the layers of dielectric material is about 1.6 mils thick.

18. The feed-through filter capacitor of claim 17 further comprises top and bottom cap layers of dielectric material covering respective top and bottom electrodes.

19. The feed-through filter capacitor of claim 8 wherein
ones of the first electrodes are disposed on respective first layers of the dielectric material;
ones of the second electrodes are disposed on respective second layers of the dielectric material different from the first layers; and
ones of the third electrodes are disposed on respective third layers of the dielectric material different from the first and second layers, projections of edges of the third electrodes taken in the second direction are substantially between the first and the second electrodes.

20. The feed-through filter capacitor of claim 19 further comprising:
about 59 layers of dielectric material;
about 20 first electrodes;
about 20 second electrodes; and
about 20 third electrodes.

21. The feed-through filter capacitor of claim 20 wherein each of the layers of dielectric material is about 1.0 mils thick.

22. The feed-through filter capacitor of claim 21 further comprises top and bottom cap layers of dielectric material covering respective top and bottom electrodes.

23. A feed-through filter capacitor comprising:
layers of dielectric material having at least first and second holes passing therethrough;
first electrodes disposed on layers of the dielectric material and extending in a first direction substantially perpendicular to a centerline of one of the holes;
second electrodes disposed on layers of the dielectric material and extending in the first direction;
third electrodes disposed on layers of the dielectric material and extending in the first direction; and
fourth electrodes disposed on layers of the dielectric material and extending in the first direction,
the layers of dielectric material being sufficiently thin and the first, second and third electrodes being sufficiently numerous that a first capacitor is formed substantially wholly by fringe-effect capacitance between the first and fourth electrodes, a second capacitor is formed substantially wholly by fringe-effect capacitance between the second and fourth electrodes, and a third capacitor is formed substantially wholly by fringe-effect capacitance between the fourth and third electrodes.

24. The feed-through filter capacitor of claim 23 further comprising:
a first electrode contact electrically connected to the first electrodes;
a second electrode contact electrically connected to the second electrodes;
a third electrode contact electrically connected to the third electrodes; and
a fourth electrode contact electrically connected to the fourth electrodes,
the first capacitor being electrically connected between the first and fourth electrode contacts, the second capacitor being electrically connected between the second and fourth electrode contacts, and the third capacitor being electrically connected between the fourth and third electrode contacts, the first and the third capacitors being electrically connected in series between the first and the third electrode contacts, and the second and the third capacitors being electrically connected in series between the second and the third electrode contacts.

25. The feed-through filter capacitor of claim 24 wherein the layers of dielectric material comprise a body of the feed-through filter capacitor having an external surface and the first and second electrode contacts are disposed in respective first and second holes and adapted to be electrically connectable to respective first and second electrical conductors extending through the respective first and second holes, the third electrode contact being formed over a first portion of the external surface and adapted to be electrically connectable to an external contact, and the fourth electrode contact being formed over a second portion of the external surface and adapted to be electrically connectable to an external contact.

26. The feed-through filter capacitor of claim 25 wherein
ones of the first electrodes are disposed on respective layers of the dielectric material;
ones of the second electrodes are disposed on the respective layers of the dielectric material with respective ones of the first electrodes;
ones of the third electrodes are disposed on the respective layers of the dielectric material with respective ones of the first electrodes; and
ones of the fourth electrodes are disposed on the respective layers of the dielectric material with respective ones of the first electrodes, first portions of the fourth electrodes being located between the first and the third electrodes and second portions of the fourth electrodes being located between the second and the third electrodes.

27. The feed-through filter capacitor of claim 25 wherein
ones of the first electrodes are disposed on respective first layers of the dielectric material;
ones of the second electrodes are disposed on the respective first layers of the dielectric material with respective ones of the first electrodes;
ones of the third electrodes are disposed on the respective first layers of the dielectric material with respective ones of the first electrodes; and
ones of the fourth electrodes are disposed on respective second layers of the dielectric material different from the first layers, projections of first edges of the fourth electrodes taken in the second direction are substantially between the first and the third electrodes and projections of second edges of the fourth electrodes taken in the second direction are substantially between the second and the third electrodes.

28. The feed-through filter capacitor of claim 25 wherein
ones of the first electrodes are disposed on respective first layers of the dielectric material;
ones of the second electrodes are disposed on the respective first layers of the dielectric material with respective ones of the first electrodes;
ones of the third electrodes are disposed on the respective second layers of the dielectric material different from the first layers; and
ones of the fourth electrodes are disposed on respective third layers of the dielectric material different from the first and second layers, projections of first edges of the fourth electrodes taken in the second direction are substantially between the first and the third electrodes and projections of second edges of the fourth electrodes taken in the second direction are substantially between the second and the third electrodes.

29. The feed-through filter capacitor of claim 23 wherein the layers of dielectric material are a ceramic dielectric material.

30. A feed-through filter capacitor comprising:
layers of dielectric material forming a body having an external surface and having at least first and second holes passing therethrough;
a first electrode contact disposed in the first hole and adapted to be electrically connectable to an electrical conductor extending through the first hole;
a second electrode contact disposed in the second hole and adapted to be electrically connectable to an electrical conductor extending through the second hole;
a third electrode contact formed over one portion of the external surface and adapted to be electrically connectable to a first external contact;
a fourth electrode contact formed over another portion of the external surface and adapted to be electrically connectable to a second external contact;
spatially overlapping first electrodes disposed on layers of the dielectric material and electrically connected to the first electrode contact;
spatially overlapping second electrodes disposed on layers of the dielectric material and electrically connected to the second electrode contact;
spatially overlapping third electrodes disposed on layers of the dielectric material and electrically connected to the third electrode contact; and
spatially overlapping fourth electrodes disposed on layers of the dielectric material and electrically connected to the fourth electrode contact, wherein all electrodes spatially overlapping the third electrodes are connected to the third electrode contact.

31. The feed-through filter capacitor of claim 30 further comprising:
a first capacitor formed substantially wholly by fringe-effect capacitance between the first and fourth electrodes;
a second capacitor formed substantially wholly by fringe-effect capacitance between the second and fourth electrodes; and
a third capacitor formed substantially wholly by fringe-effect capacitance between the fourth and third electrodes.

32. The feed-through filter capacitor of claim 30 wherein the dielectric material is a ceramic dielectric material.

33. The feed-through filter capacitor of claim 30 wherein
ones of the first electrodes are disposed on respective layers of the dielectric material;
ones of the second electrodes are disposed on the respective layers of the dielectric material with respective ones of the first electrodes;
ones of the third electrodes are disposed on the respective layers of the dielectric material with the respective ones of the first electrodes; and
ones of the fourth electrodes are disposed on the respective layers of dielectric material with the ones of the first electrodes, first portions of the fourth electrodes being disposed between the first and the third electrodes and second portions of the fourth electrodes being disposed between the second and the third electrodes.

34. The feed-through filter capacitor of claim 33 further comprising:
about 19 layers of dielectric material;
about 20 first electrodes;
about 20 second electrodes;
about 20 third electrodes; and
about 20 fourth electrodes.

35. The feed-through filter capacitor of claim 34 wherein each of the layers of dielectric material is about 3.2 mils thick.

36. The feed-through filter capacitor of claim 35 comprises top and bottom cap layers of dielectric material covering respective top and bottom electrodes.

37. The feed-through filter capacitor of claim 30 wherein
ones of the first electrodes are disposed on respective first layers of the dielectric material;
ones of the second electrodes are disposed on the respective first layers of the dielectric material with respective ones of the first electrodes;
ones of the third electrodes being disposed on the respective first layers of the dielectric material with the respective ones of the first electrodes; and
ones of the fourth electrodes are disposed on the respective second layers of dielectric material different from the first layers, projections of first edges of the fourth electrodes taken in the second direction are substantially between the first and the third electrodes and projections of second edges of the fourth electrodes taken the second direction are substantially between the second and the third electrodes.

38. The feed-through filter capacitor of claim 37 further comprising:
about 38 layers of dielectric material;
about 19 of the first electrodes;
about 19 of second electrodes;
about 19 of the third electrodes; and
about 20 fourth electrodes.

39. The feed-through filter capacitor of claim 38 wherein each of the layers of dielectric material is about 1.6 mils thick.

40. The feed-through filter capacitor of claim 39 further comprises top and bottom cap layers of dielectric material covering respective top and bottom electrodes.

41. The feed-through filter capacitor of claim 30 wherein
ones of the first electrodes are disposed on respective first layers of the dielectric material;
ones of the second electrodes are disposed on the respective first layers of the dielectric material with respective ones of the first electrodes;
ones of the third electrodes are disposed on respective second layers of the dielectric material different from the first layers; and
ones of the fourth electrodes are disposed on respective third layers of dielectric material different from the first and second layers, projections of first edges of the fourth electrodes taken in the second direction are substantially between the first and the third electrodes and projections of second edges of the fourth electrodes taken in the second direction are substantially between the second and the third electrodes.

42. The feed-through filter capacitor of claim 41 further comprising:
about 59 layers of dielectric material;
about 20 of the first electrodes;
about 20 of the second electrodes;
about 20 third electrodes; and
about 20 fourth electrodes.

43. The feed-through filter capacitor of claim 42 wherein each of the layers of dielectric material is about 1.0 mils thick.

44. The feed-through filter capacitor of claim 43 further comprises top and bottom cap layers of dielectric material covering respective top and bottom electrodes.

45. A feed-through filter capacitor comprising:
layers of dielectric material forming a body having an external surface and having at least one a hole passing therethrough;
a first electrode contact disposed in the at least one hole and adapted to be electrically connectable to an electrical conductor extending through the hole;
a second electrode contact formed over one portion of the external surface and adapted to be electrically connectable to a first external contact;
a third electrode contact formed over another portion of the external surface and adapted to be electrically connectable to a second external contact;
spatially overlapping first electrodes disposed on layers of the dielectric material and electrically connected to the first electrode contact;
spatially overlapping second electrodes disposed on layers of the dielectric material and electrically connected to the second electrode contact; and
spatially overlapping third electrodes disposed on layers of the dielectric material and electrically connected to the third electrode contact, wherein all electrodes spatially overlapping the first electrodes are connected to the first electrode contact.

46. A feed-through filter capacitor comprising:
layers of dielectric material forming a body having an external surface and having at least one a hole passing therethrough;
a first electrode contact disposed in the at least one hole and adapted to be electrically connectable to an electrical conductor extending through the hole;
a second electrode contact formed over one portion of the external surface and adapted to be electrically connectable to a first external contact;
a third electrode contact formed over another portion of the external surface and adapted to be electrically connectable to a second external contact;
spatially overlapping first electrodes disposed on layers of the dielectric material and electrically connected to the first electrode contact;
spatially overlapping second electrodes disposed on layers of the dielectric material and electrically connected to the second electrode contact; and
spatially overlapping third electrodes disposed on layers of the dielectric material and electrically connected to the third electrode contact, wherein all electrodes in the capacitor spatially overlapping the third electrodes are connected to the third electrode contact.

47. A feed-through filter capacitor comprising:
layers of dielectric material forming a body having an external surface and having at least first and second holes passing therethrough;
a first electrode contact disposed in the first hole and adapted to be electrically connectable to an electrical conductor extending through the first hole;
a second electrode contact disposed in the second hole and adapted to be electrically connectable to an electrical conductor extending through the second hole;
a third electrode contact formed over one portion of the external surface and adapted to be electrically connectable to a first external contact;
a fourth electrode contact formed over another portion of the external surface and adapted to be electrically connectable to a second external contact;
spatially overlapping first electrodes disposed on layers of the dielectric material and electrically connected to the first electrode contact;
spatially overlapping second electrodes disposed on layers of the dielectric material and electrically connected to the second electrode contact;

spatially overlapping third electrodes disposed on layers of the dielectric material and electrically connected to the third electrode contact; and spatially overlapping fourth electrodes disposed on layers of the dielectric material and electrically connected to the fourth electrode contact, wherein all electrodes spatially overlapping the first electrodes are connected to the first electrode contact.

48. A feed-through filter capacitor comprising:

layers of dielectric material forming a body having an external surface and having at least first and second holes passing therethrough;

a first electrode contact disposed in the first hole and adapted to be electrically connectable to an electrical conductor extending through the first hole;

a second electrode contact disposed in the second hole and adapted to be electrically connectable to an electrical conductor extending through the second hole;

a third electrode contact formed over one portion of the external surface and adapted to be electrically connectable to a first external contact;

a fourth electrode contact formed over another portion of the external surface and adapted to be electrically connectable to a second external contact;

spatially overlapping first electrodes disposed on layers of the dielectric material and electrically connected to the first electrode contact;

spatially overlapping second electrodes disposed on layers of the dielectric material and electrically connected to the second electrode contact;

spatially overlapping third electrodes disposed on layers of the dielectric material and electrically connected to the third electrode contact; and spatially overlapping fourth electrodes disposed on layers of the dielectric material and electrically connected to the fourth electrode contact, wherein all electrodes spatially overlapping the second electrodes are connected to the second electrode contact.

49. A feed-through filter capacitor comprising:

layers of dielectric material forming a body having an external surface and having at least first and second holes passing therethrough;

a first electrode contact disposed in the first hole and adapted to be electrically connectable to an electrical conductor extending through the first hole;

a second electrode contact disposed in the second hole and adapted to be electrically connectable to an electrical conductor extending through the second hole;

a third electrode contact formed over one portion of the external surface and adapted to be electrically connectable to a first external contact;

a fourth electrode contact formed over another portion of the external surface and adapted to be electrically connectable to a second external contact;

spatially overlapping first electrodes disposed on layers of the dielectric material and electrically connected to the first electrode contact;

spatially overlapping second electrodes disposed on layers of the dielectric material and electrically connected to the second electrode contact;

spatially overlapping third electrodes disposed on layers of the dielectric material and electrically connected to the third electrode contact; and spatially overlapping fourth electrodes disposed on layers of the dielectric material and electrically connected to the fourth electrode contact, wherein all electrodes spatially overlapping the fourth electrodes are connected to the fourth electrode contact.

* * * * *